(12) United States Patent
Mitsui et al.

(10) Patent No.: US 11,089,648 B2
(45) Date of Patent: Aug. 10, 2021

(54) USER TERMINAL FOR EXECUTING DUAL CONNECTIVITY

(71) Applicant: Kyocera Corporation, Kyoto (JP)

(72) Inventors: Katsuhiro Mitsui, Ritto (JP); Yushi Nagasaka, Ritto (JP); Masato Fujishiro, Yokohama (JP); Henry Chang, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 344 days.

(21) Appl. No.: 15/545,201

(22) PCT Filed: Jan. 25, 2016

(86) PCT No.: PCT/JP2016/051963
§ 371 (c)(1),
(2) Date: Jul. 20, 2017

(87) PCT Pub. No.: WO2016/121670
PCT Pub. Date: Aug. 4, 2016

(65) Prior Publication Data
US 2017/0374705 A1    Dec. 28, 2017

Related U.S. Application Data

(60) Provisional application No. 62/110,023, filed on Jan. 30, 2015.

(51) Int. Cl.
*H04W 72/04* (2009.01)
*H04L 12/24* (2006.01)
(Continued)

(52) U.S. Cl.
CPC ......... *H04W 76/18* (2018.02); *H04L 41/0668* (2013.01); *H04W 36/0058* (2018.08);
(Continued)

(58) Field of Classification Search
CPC ..... H04W 76/15; H04W 76/27; H04W 76/19; H04W 76/18; H04W 76/20;
(Continued)

(56) References Cited

U.S. PATENT DOCUMENTS 9,363,781 B2 *  6/2016  Won .............. H04W 60/04
9,432,927 B2 *  8/2016  Kim ............. H04W 52/0216
(Continued)

FOREIGN PATENT DOCUMENTS

JP   2013-526239 A   6/2013
JP   2015-500595 A   1/2015
WO   2015/012077 A1  1/2015

OTHER PUBLICATIONS

3rd Generation Partnership Project; "Technical Specification Group Radio Access Network; Study on Small Cell enhancements for E-UTRA and E-UTRAN; Higher Layer aspects (Repalse 12)" 3GPP TR 36.842 V12.0.0, 2013, 71 pages.
(Continued)

*Primary Examiner* — Hoang-Chuong Q Vu

(57) ABSTRACT

A user terminal according to an embodiment is capable of executing dual connectivity. The user terminal comprises: a controller configured to execute the dual connectivity in which a first base station configured to establish an RRC connection with the user terminal and a second base station configured to provide an additional radio resource are used; and a transmitter configured to preferentially transmit, if a radio link failure is detected between the user terminal and the first base station, to the second base station, an RRC reestablishment request for reestablishing the RRC connection.

5 Claims, 11 Drawing Sheets

(51) Int. Cl.
- *H04W 88/08* (2009.01)
- *H04W 88/06* (2009.01)
- *H04W 76/18* (2018.01)
- *H04W 76/20* (2018.01)
- *H04W 36/00* (2009.01)
- *H04W 76/27* (2018.01)
- *H04W 36/30* (2009.01)
- *H04W 76/15* (2018.01)

(52) U.S. Cl.
CPC ... *H04W 36/0069* (2018.08); *H04W 36/0079* (2018.08); *H04W 72/0413* (2013.01); *H04W 76/20* (2018.02); *H04W 76/27* (2018.02); *H04W 36/305* (2018.08); *H04W 76/15* (2018.02); *H04W 88/06* (2013.01); *H04W 88/08* (2013.01)

(58) Field of Classification Search
CPC . H04W 72/0413; H04W 88/02; H04W 88/06; H04W 88/08; H04W 36/00; H04W 36/0069; H04W 36/0027; H04W 36/0079; H04W 36/0055; H04W 36/305; H04W 36/04; H04W 36/30; H04W 36/34; H04W 36/36; H04L 41/0668
See application file for complete search history.

(56) References Cited

U.S. PATENT DOCUMENTS

| | | | | |
|---|---|---|---|---|
| 9,554,305 | B2* | 1/2017 | Moustafa | H04W 36/0079 |
| 9,838,158 | B2* | 12/2017 | Yi | H04L 1/1809 |
| 9,936,515 | B2* | 4/2018 | Fujishiro | H04W 72/085 |
| 2010/0093350 | A1* | 4/2010 | Wang | H04W 48/02 455/436 |
| 2011/0294508 | A1 | 12/2011 | Min et al. | |
| 2013/0182563 | A1 | 7/2013 | Johansson et al. | |
| 2013/0303165 | A1* | 11/2013 | Hole | H04W 36/0055 455/435.2 |
| 2014/0056243 | A1* | 2/2014 | Pelletier | H04W 74/04 370/329 |
| 2014/0119175 | A1* | 5/2014 | Velde | H04W 76/19 370/225 |
| 2014/0274029 | A1* | 9/2014 | Radulescu | H04W 24/04 455/424 |
| 2014/0335872 | A1* | 11/2014 | Yamada | H04W 24/04 455/450 |
| 2014/0355562 | A1* | 12/2014 | Gao | H04B 7/02 370/331 |
| 2015/0045035 | A1* | 2/2015 | Nigam | H04W 36/305 455/436 |
| 2015/0087313 | A1* | 3/2015 | Kim | H04W 8/02 455/437 |
| 2015/0092686 | A1* | 4/2015 | Cui | H04W 48/16 370/329 |
| 2015/0124708 | A1* | 5/2015 | Blankenship | H04W 36/0077 370/329 |
| 2015/0133122 | A1* | 5/2015 | Chen | H04W 36/305 455/436 |
| 2015/0181479 | A1* | 6/2015 | Lin | H04W 36/0069 370/331 |
| 2015/0245402 | A1* | 8/2015 | Mochizuki | H04W 36/22 370/331 |
| 2015/0271861 | A1* | 9/2015 | Li | H04W 56/001 455/426.1 |
| 2015/0312826 | A1* | 10/2015 | Yiu | H04W 48/16 455/437 |
| 2015/0373628 | A1* | 12/2015 | Hwang | H04W 48/10 370/338 |
| 2016/0007403 | A1* | 1/2016 | Futaki | H04L 5/001 370/338 |
| 2016/0057800 | A1* | 2/2016 | Ingale | H04W 76/18 370/216 |
| 2016/0095018 | A1* | 3/2016 | Vajapeyam | H04W 36/0005 370/331 |
| 2016/0157211 | A1 | 6/2016 | Kato et al. | |
| 2016/0183321 | A1* | 6/2016 | Wen | H04W 76/18 370/329 |
| 2016/0242064 | A1* | 8/2016 | Lee | H04W 56/00 |
| 2016/0255552 | A1* | 9/2016 | Uchino | H04B 7/024 370/329 |
| 2016/0269952 | A1* | 9/2016 | Moon | H04W 76/18 |
| 2017/0019945 | A1* | 1/2017 | Chiba | H04W 74/0833 |
| 2017/0070896 | A1* | 3/2017 | Shindo | H04W 24/02 |
| 2017/0099621 | A1* | 4/2017 | Michaelsen | H04W 36/0033 |
| 2017/0164419 | A1* | 6/2017 | Kim | H04W 76/15 |
| 2017/0170941 | A1* | 6/2017 | Yang | H04L 5/0098 |
| 2017/0230232 | A1* | 8/2017 | Liu | H04L 41/0668 |
| 2017/0265242 | A1* | 9/2017 | Yang | H04W 76/18 |
| 2017/0273095 | A1* | 9/2017 | Heo | H04B 17/318 |
| 2017/0318504 | A1* | 11/2017 | Zhang | H04W 36/0055 |
| 2019/0261208 | A1* | 8/2019 | Lee | H04W 76/18 |
| 2020/0084686 | A1* | 3/2020 | Nigam | H04W 72/1268 |

OTHER PUBLICATIONS

International Search Report (Form PCT/ISA/210) dated Apr. 12, 2016, issued for PCT/JP2016/051963.

* cited by examiner

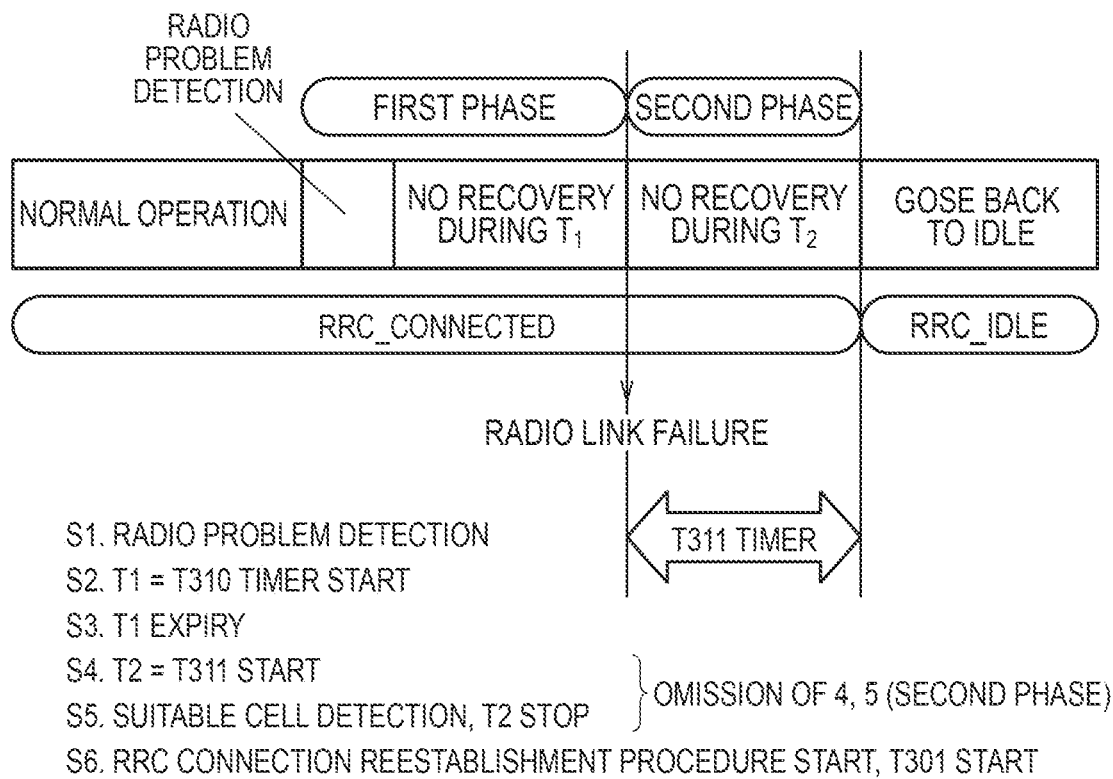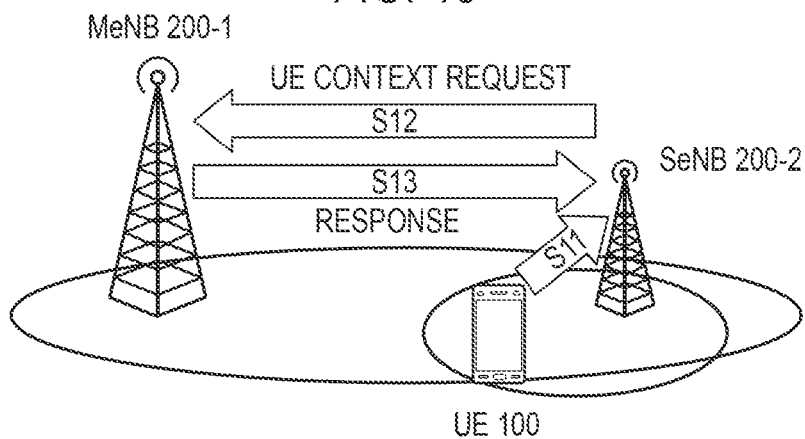

FIG. 11

ReestablishmentInfo information element
-- ASN1START

ReestablishmentInfo ::=                    SEQUENCE {
    sourcePhysCellId                            PhysCellId,
    targetCellShortMAC-I                        ShortMAC-I,
    additionalReestabInfoList                   AdditionalReestabInfoList
                    OPTIONAL,
    ...
}

AdditionalReestabInfoList ::=        SEQUENCE ( SIZE (1..maxReestabInfo) )
OF AdditionalReestabInfo AdditionalReestabInfo ::= SEQUENCE{
    cellIdentity                                CellIdentity,
    key-eNodeB-Star                             Key-eNodeB-Star,
    shortMAC-I
    ShortMAC-I
}

Key-eNodeB-Star ::=                          BIT STRING (SIZE (256))

-- ASN1STOP

FIG. 13

```
RRCConnectionReestablishmentRequest ::= SEQUENCE {
    criticalExtensions              CHOICE {
        rrcConnectionReestablishmentRequest-r8
                                        RRCConnectionReestablishmentRequest-r8-IEs,
        criticalExtensionsFuture        SEQUENCE {}
    }
}

RRCConnectionReestablishmentRequest-r8-IEs ::= SEQUENCE {
    ue-Identity                     ReestabUE-Identity,
    reestablishmentCause            ReestablishmentCause,
    spare                           BIT STRING (SIZE (2))
}

ReestabUE-Identity ::=          SEQUENCE {
    c-RNTI                          C-RNTI,
    physCellId                      PhysCellId,
    shortMAC-I                      ShortMAC-I
-If UE was on Dual Connectivity
ReestabUE-Identity SeNB ::=             SEQUENCE {
    c-RNTI                          C-RNTI,
    physCellId                      PhysCellId,
    shortMAC-I                      ShortMAC-I

}

ReestablishmentCause ::=        ENUMERATED {
                                    reconfigurationFailure, handoverFailure,
                                    otherFailure, spare1}
```

FIG. 14

```
RRCConnectionReestablishmentRequest ::= SEQUENCE {
    criticalExtensions                  CHOICE {
        rrcConnectionReestablishmentRequest-r8
                                        RRCConnectionReestablishmentRequest-r8-IEs,
        criticalExtensionsFuture        SEQUENCE {}
    }
}

RRCConnectionReestablishmentRequest-r8-IEs ::= SEQUENCE {
    ue-Identity                         ReestabUE-Identity,
    reestablishmentCause                ReestablishmentCause,
    spare                               BIT STRING (SIZE (2))
}

ReestabUE-Identity ::=                  SEQUENCE {
    c-RNTI                              C-RNTI,
    physCellId                          PhysCellId,
    shortMAC-I                          ShortMAC-I
    DualConnctivityIndicator
}

ReestablishmentCause ::=                ENUMERATED {
                                        reconfigurationFailure, handoverFailure,
                                        otherFailure, spare1}
```

USER TERMINAL FOR EXECUTING DUAL CONNECTIVITY

TECHNICAL FIELD

The present application relates to a user terminal and a base station capable of executing dual connectivity.

BACKGROUND ART

3GPP (3rd Generation Partnership Project), which is a project aiming to standardize a mobile communication system, plans to introduce dual connectivity in Release 12 and later releases (see Non Patent Document 1). In the dual connectivity, a user terminal establishes a connection with each of a plurality of base stations. Radio resources are allocated from the plurality of base stations, and thus, it is possible to expect an improvement in throughput.

In the dual connectivity, of the plurality of base stations configured to establish a connection with the user terminal, only one base station (hereinafter, called "master base station") establishes an RRC connection with the user terminal. On the other hand, of the plurality of base stations, another base station (hereinafter, called "secondary base station") provides an additional radio resource to the user terminal without establishing an RRC connection with the user terminal.

PRIOR ART DOCUMENT

Non-Patent Document

Non Patent Document 1: 3GPP technical report "TR 36.842 V12.0.0" Jan. 7, 2014

SUMMARY OF THE INVENTION

A user terminal according to an embodiment is capable of executing dual connectivity. The user terminal comprises: a controller configured to execute the dual connectivity in which a first base station configured to establish an RRC connection with the user terminal and a second base station configured to provide an additional radio resource are used; and a transmitter configured to preferentially transmit, if a radio link failure is detected between the user terminal and the first base station, to the second base station, an RRC reestablishment request for reestablishing the RRC connection.

BRIEF DESCRIPTION OF THE DRAWINGS

FIG. 9 is a diagram for describing an operation according to the embodiment.

FIG. 10 is a diagram illustrating an example of a method of obtaining, by an SeNB 200-2, context information.

FIG. 11 is a chart illustrating an example of the context information by the SeNB 200-2.

FIG. 13 is a chart for describing an example of an IE included in an RRC reestablishment request.

FIG. 14 is a diagram for describing an example of the IE included in the RRC reestablishment request.

DESCRIPTION OF THE EMBODIMENT

Overview of Embodiment

Figure 1:
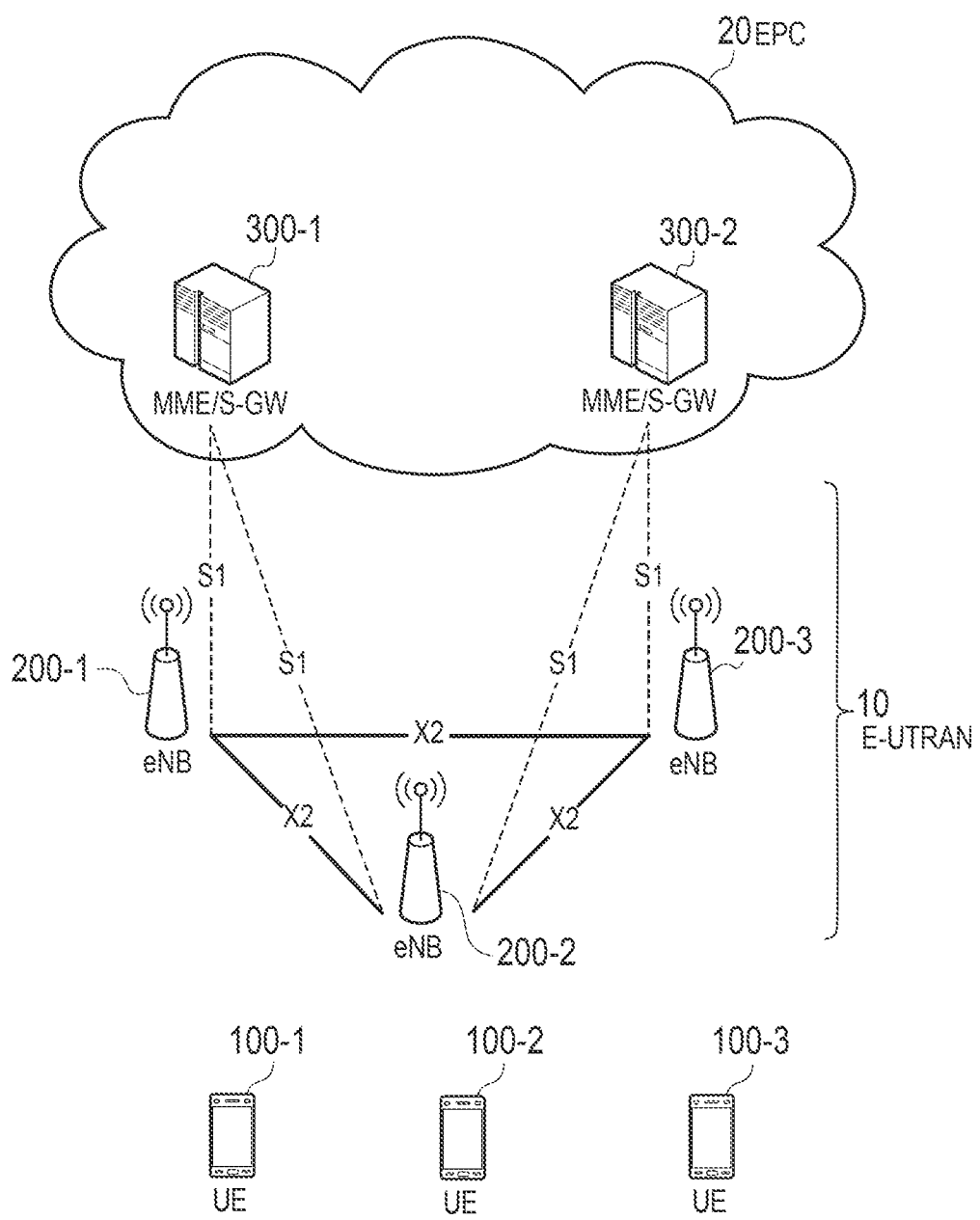
FIG. 1 is a configuration diagram of an LTE system according to an embodiment.

A case is assumed in which, while executing dual connectivity, a radio link failure occurs between a user terminal and a master base station. In a current specification, if the user terminal senses a radio link failure with the master base station, the user terminal starts searching a suitable cell. If the user terminal cannot search a suitable cell within a predetermined time period, the user terminal transitions to an idle state.

Even when the user terminal is capable of searching an appropriate cell within a predetermined time period, if context information of the user terminal is not held in the cell (base station), the user terminal has to perform an RRC establishment for enabling a predetermined security, rather than an RRC reestablishment performed if a predetermined security is enabled. Therefore, it may take a long period time for the user terminal to resume communication.

Thus, an object of the present application is to provide a base station and a user terminal by which it is possible for the user terminal to efficiently resume communication if a radio link failure occurs between the user terminal and a master base station.

A user terminal according to an embodiment is capable of executing dual connectivity. The user terminal comprises: a controller configured to execute the dual connectivity in which a first base station configured to establish an RRC connection with the user terminal and a second base station configured to provide an additional radio resource are used; and a transmitter configured to preferentially transmit, if a radio link failure is detected between the user terminal and the first base station, to the second base station, an RRC reestablishment request for reestablishing the RRC connection.

In the embodiment, the transmitter preferentially transmits, if a radio link failure is not detected between the user terminal and the second base station, to the second base station, the RRC reestablishment request.

In the embodiment, the controller omits a cell search if a radio link failure is not detected between the user terminal and the second base station. The transmitter transmits, with the cell search being omitted, the RRC reestablishment request to the second base station.

In the embodiment, the controller performs a cell search, if the radio link failure is detected. The user terminal further comprises a receiver configured to receive, from the first base station, preferential information for prioritizing a cell of the second base station when the cell search is performed. The controller sets the preferential information in a connected state in which the RRC connection is established between the user terminal and the first base station. The controller performs the cell search, based on the preferential information.

In the embodiment, the transmitter transmits, before transmitting the RRC reestablishment request, a request for allocating an uplink radio resource, to the second base station. The transmitter uses the radio resource allocated to the user terminal in response to the request to transmit the RRC reestablishment request to the second base station.

In the embodiment, the RRC reestablishment request includes authentication information based on a cell identifier of the second base station.

In the embodiment, the RRC reestablishment request includes an indicator indicating that the user terminal has executed the dual connectivity.

In the embodiment, the transmitter transmits, after an RRC connection with the second base station is established, a failure report indicating that the radio link failure is detected between the user terminal and the first base station. The failure report includes an indicator indicating that the user terminal has executed the dual connectivity.

A base station according to the embodiment is capable of executing dual connectivity. The base station comprises: a controller configured to provide an additional radio resource to a user terminal configured to establish an RRC connection with a master base station in the dual connectivity. The controller obtains context information of the user terminal used for the user terminal to reestablish the RRC connection. The controller reestablishes, upon receiving from the user terminal an RRC reestablishment request for reestablishing the RRC connection, the RRC connection, on the basis of the context information.

The base station further comprises: a receiver configured to receive, from the master base station, an addition request for requesting provision of an additional radio resource to the user terminal in the dual connectivity. The addition request includes the context information.

In the embodiment, the controller obtains, after starting execution of the dual connectivity, the context information from the master base station.

In the embodiment, the controller obtains the context information transmitted from the master base station, in response to a measurement report about a handover from the user terminal.

In the embodiment, the controller requests, in response to reception of the RRC reestablishment request, the context information to the master base station or a target base station that receives a handover request about the user terminal from the master base station.

The base station according to the embodiment further comprises: a receiver configured to receive a request for an uplink radio resource allocation from the user terminal. The controller allocates, in response to the request for an uplink radio resource allocation, a predetermined radio resource to the user terminal. The controller reestablishes, upon reception of the RRC reestablishment request transmitted by using the predetermined radio resource, an RRC connection with the user terminal.

In the embodiment, the controller authenticates, if authentication information based on a cell identifier of the second base station is included in the RRC reestablishment request, the user terminal, on the basis of the authentication information.

In the embodiment, the RRC reestablishment request includes an indicator indicating that the user terminal has executed the dual connectivity.

In the embodiment, it further comprises: a receiver configured to receive, from the user terminal, a failure report indicating that a radio link failure is detected between the user terminal and the master base station. The failure report includes an indicator indicating that the user terminal has executed the dual connectivity.

The base station according to the embodiment further comprises: a receiver configured to receive, from the master base station, a release message for releasing a control plane and a radio for the user terminal. The controller rejects the release message if reestablishing the RRC connection with the user terminal.

In the embodiment, the controller notifies, if rejecting the release message, the master base station of a rejection response to the release message. The rejection response includes a reason of a rejection response indicating that the base station has reestablished the RRC connection with the user terminal.

The base station according to the embodiment further comprises: a receiver configured to receive, from the master base station, an addition request for requesting provision of an additional radio resource in the dual connectivity. The controller notifies the master base station of a rejection request to the addition request. The rejection response includes a reason of a rejection response indicating that a radio link failure in the master base station is a cause.

In the embodiment, the controller requests, if authentication information based on a cell identifier of another base station different from the base station is included in the RRC reestablishment request, the another base station indicated by the cell identifier to authenticate the user terminal. The controller is notified of a response to the request including an authentication result of the user terminal.

A base station according to an embodiment is capable of executing dual connectivity. The base station comprises: a controller configured to establish an RRC connection with a user terminal in the dual connectivity; and a transmitter configured to transmit, to another base station, context information of the user terminal used for reestablishment of the RRC connection. The transmitter transmits, if the another base station is a secondary base station configured to provide an additional radio resource to the user terminal in the dual connectivity or a candidate for the secondary base station, the context information to the another base station.

In the embodiment, the transmitter transmits, to the another base station, an addition request for requesting provision of an additional radio resource to the user terminal in the dual connectivity. The addition request includes the context information used for reestablishment of the RRC connection.

The base station according to the embodiment further comprises: a receiver configured to receive a measurement report about a handover from the user terminal. The transmitter transmits the context information in accordance with the measurement report.

In the embodiment, the transmitter transmits, if the context information is requested from the another base station, the context information to the another base station.

In the embodiment, the controller notifies the user terminal of preferential information for prioritizing a cell of the another base station when the user terminal performs a cell search if a radio link failure is detected between the user terminal and the base station. The preferential information is set to the user terminal in a connected state in which the RRC connection is established between the user terminal and the base station.

The base station according to the embodiment further comprises: a receiver configured to receive, after a radio link failure is detected between the user terminal and the base station, a failure report indicating that the radio link failure is detected. The failure report includes an indicator indicating that the user terminal has executed the dual connectivity.

In the embodiment, the controller performs authentication of the user terminal on the basis of authentication information included in the request and a cell identifier of the base station, if the authentication of the user terminal is requested from the another base station. The transmitter transmits a response to the request including an authentication result of the user terminal, to the another base station.

It is noted that a "base station" as used in the claims is a concept including not only a general base station (a so-called eNB) but also an RRH base station (Remote Radio Head).

Embodiment

Hereinafter, an embodiment in which contents of the present application applies to the LTE system will be described.

(1) System Configuration

FIG. 1 is a configuration diagram of an LTE system according to the embodiment. As illustrated in FIG. 1, the LTE system according to the embodiment comprises UEs (User Equipments) 100, E-UTRAN (Evolved-UMTS Terrestrial Radio Access Network) 10, and EPC (Evolved Packet Core) 20.

The UE 100 corresponds to the user terminal. The UE 100 is a mobile communication apparatus and performs radio communication with a cell (a serving cell). Configuration of UE 100 will be described later.

The E-UTRAN 10 corresponds to a radio access network. The E-UTRAN 10 includes a plurality of eNBs 200 (evolved Node-Bs). The eNB 200 corresponds to a base station. The eNBs 200 are connected mutually via an X2 interface. Configuration of eNB 200 will be described later.

The eNB 200 manages one cell or a plurality of cells and performs radio communication with the UE 100 that establishes a connection with the cell. The eNB 200 has a radio resource management (RRM) function, a routing function of user data, and a measurement control function for mobility control and scheduling and the like. The "cell" is used as a term indicating a minimum unit of a radio communication area, and is also used as a term indicating a function of performing radio communication with the UE 100.

The EPC 20 corresponds to a core network. The EPC 20 includes MMEs (Mobility Management Entities)/S-GWs (Serving-Gateways) 300. The MME performs various mobility controls and the like, for the UE 100. The SGW performs transfer control of user data. The eNB 200 is connected to the MME/S-GW 300 via an S1 interface.

Figure 2:
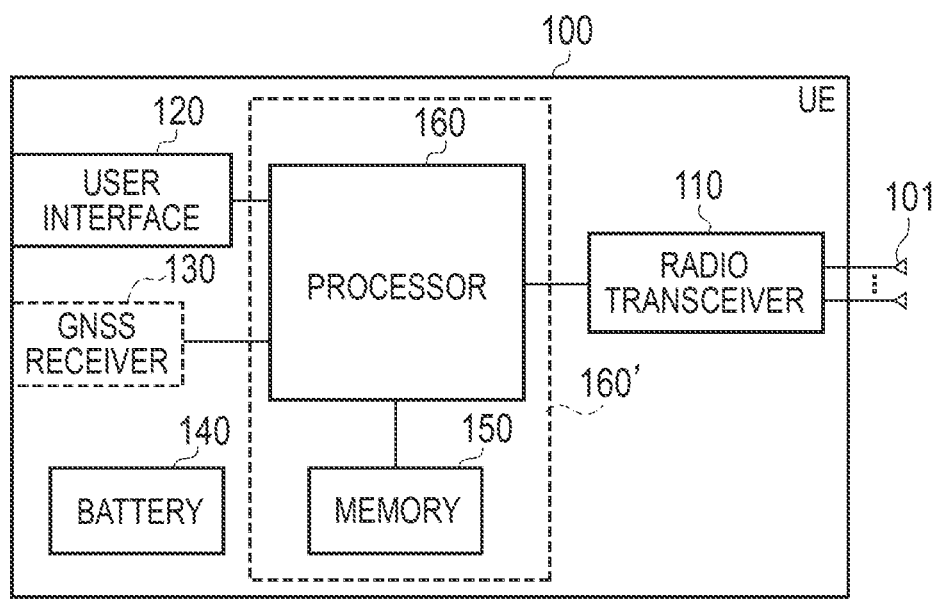
FIG. 2 is a block diagram of a UE according to the embodiment.

FIG. 2 is a block diagram of the UE 100. As illustrated in FIG. 2, the UE 100 comprises a plurality of antennas 101, a radio transceiver 110, a user interface 120, a GNSS (Global Navigation Satellite System) receiver 130, a battery 140, a memory 150, and a processor 160. The memory 150 and the processor 160 constitute a controller. The UE 100 may not have the GNSS receiver 130. Furthermore, the memory 150 may be integrally formed with the processor 160, and this set (that is, a chipset) may be called a processor 160'.

The antennas 101 and the radio transceiver 110 are used to transmit and receive a radio signal. The radio transceiver 110 converts a baseband signal (transmitted signal) output from the processor 160 into the radio signal, and transmits the radio signal from the antennas 101. Furthermore, the radio transceiver 110 converts the radio signal received by the antennas 101 into the baseband signal (received signal), and outputs the baseband signal to the processor 160.

The user interface 120 is an interface with a user carrying the UE 100, and includes, for example, a display, a microphone, a speaker, various buttons and the like. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 includes a baseband processor that performs modulation and demodulation, encoding and decoding and the like of the baseband signal, and a CPU (Central Processing Unit) that performs various processes by executing the program stored in the memory 150. The processor 160 may further include a codec that performs encoding and decoding of sound and video signals. The processor 160 implements various processes and various communication protocols described later.

Figure 3:
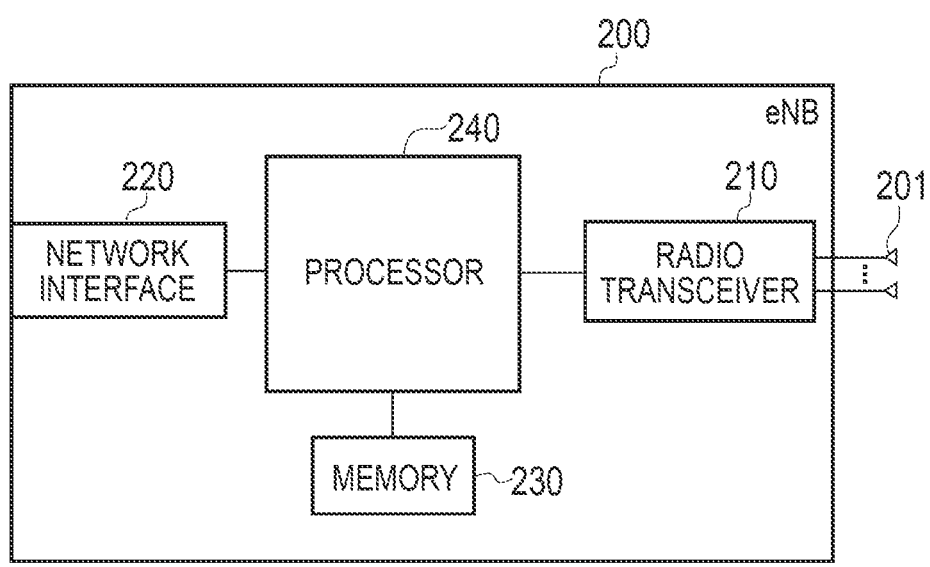
FIG. 3 is a block diagram of an eNB according to the embodiment.

FIG. 3 is a block diagram of the eNB 200. As illustrated in FIG. 3, the eNB 200 comprises a plurality of antennas 201, a radio transceiver 210, a network interface 220, a memory 230, and a processor 240. The memory 230 and the processor 240 constitute a controller. The memory 230 may be integrally formed with the processor 240, and this set (that is, a chipset) may be called a processor.

The antenna 201 and the radio transceiver 210 are used to transmit and receive a radio signal. The radio transceiver 210 converts the baseband signal (transmitted signal) output from the processor 240 into the radio signal, and transmits the radio signal from the antenna 201. Furthermore, the radio transceiver 210 converts the radio signal received by the antenna 201 into the baseband signal (received signal), and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240. The processor 240 includes the baseband processor that performs modulation and demodulation, encoding and decoding and the like of the baseband signal and a CPU that performs various processes by executing the program stored in the memory 230. The processor 240 implements various processes and various communication protocols described later.

Figure 4:
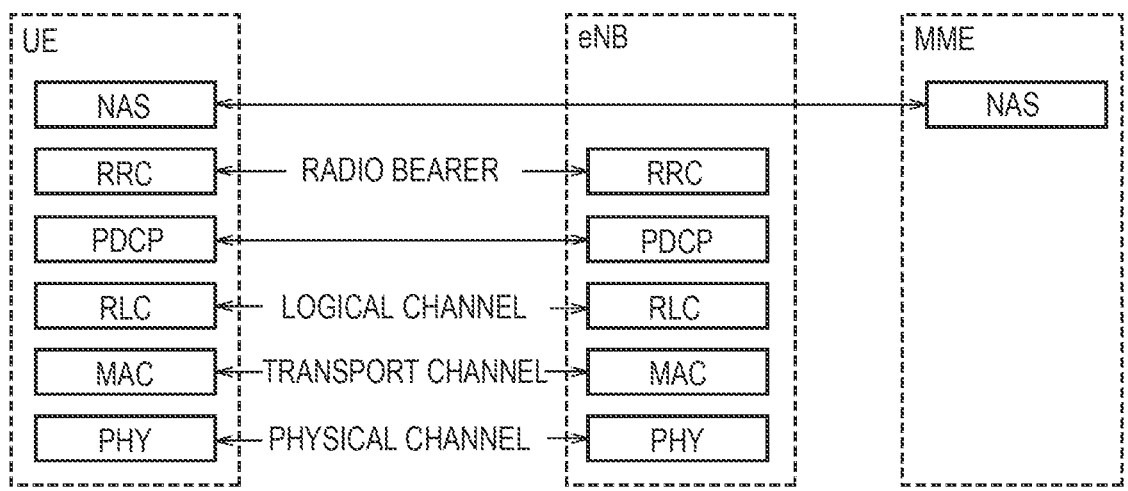
FIG. 4 is a protocol stack diagram of a radio interface according to the embodiment.

FIG. 4 is a protocol stack diagram of a radio interface in the LTE system. As illustrated in FIG. 4, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, user data and control signal are transmitted through the physical channel.

The MAC layer performs preferential control of data, and a retransmission process by hybrid ARQ (HARQ), a random access procedure when stabling a RRC connection, and the like. Between the MAC layer of the UE 100 and the MAC layer of the eNB 200, user data and control signal are transmitted via a transport channel. The MAC layer of the eNB 200 includes a scheduler for determining a transport format of an uplink and a downlink (a transport block size, a modulation and coding scheme) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, user data and control signal are transmitted via a logical channel.

The PDCP layer performs header compression and decompression, and encryption and decryption.

The RRC layer is defined only in a control plane which treats the control signal. Between the RRC layer of the UE 100 and the RRC layer of the eNB 200, a control signal (an RRC message) for various types of configurations is transmitted. The RRC layer controls the logical channel, the transport channel, and the physical channel in response to establishment, re-establishment, and release of a radio bearer. When a connection (an RRC connection) is established between the RRC of the UE 100 and the RRC of the eNB 200, the UE 100 is in an RRC connected state, and when the RRC connection is not established, the UE 100 is in an RRC idle state).

A NAS (Non-Access Stratum) layer positioned above the RRC layer performs session management and mobility management, for example.

In the LTE system, OFDMA (Orthogonal Frequency Division Multiple Access) is applied in a downlink, and SC-FDMA (Single Carrier Frequency Division Multiple Access) is applied in an uplink, respectively.

The radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each resource block includes a plurality of sub-carriers in the frequency direction.

Among radio resources (time-frequency resources) assigned to the UE 100, a frequency resource can be specified by a resource block and a time resource can be specified by a subframe (or slot).

In the downlink, an interval of several symbols at the head of each subframe is a region mainly used as a physical downlink control channel (PDCCH) for transmission of a control signal. Furthermore, the remaining interval of each subframe is a region mainly used as a physical downlink shared channel (PDSCH) for transmission of a user data.

In the uplink, both end portions in the frequency direction of each subframe are regions mainly used as a physical uplink control channel (PUCCH) for transmission of a control signal. The other portion of each subframe is a region that can be mainly used as a physical uplink shared channel (PUSCH) for transmission of user data.

(2) Dual Connectivity

The LTE system according to the embodiment supports dual connectivity. The dual connectivity is planned to be introduced in Release 12 and later releases. In the dual connectivity, the UE 100 simultaneously establishes a connection with a plurality of eNBs 200. The UE 100 is allocated, from each eNB 200, with a radio resource, and thus, it is possible to expect an improvement in throughput. It is noted that the dual connectivity may be called a carrier aggregation between eNBs 200 (inter-eNB CA).

Figure 5:
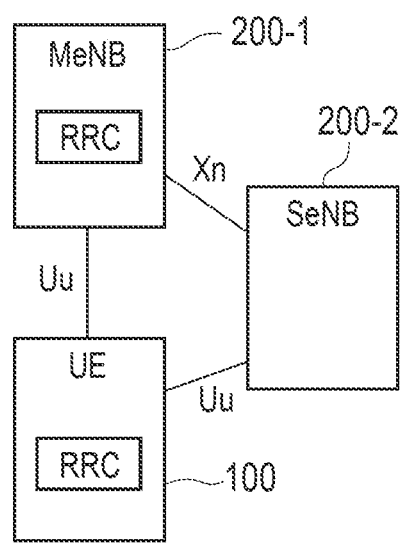
FIG. 5 is a configuration diagram of a radio frame according to the embodiment.

FIG. 5 is a diagram for describing a concept of dual connectivity.

As illustrated in FIG. 5, in the dual connectivity, of the plurality of eNBs 200 configured to establish a connection with the UE 100, only a master eNB (MeNB) 200-1 establishes an RRC connection with the UE 100. On the other hand, of the plurality of eNBs 200, a secondary eNB (SeNB) 200-2 provides an additional radio resource to the UE 100 without establishing the RRC connection with the UE 100. In other words, the MeNB 200-1 establishes not only a user plane connection, but also a control plane connection with the UE 100. On the other hand, the SeNB 200-2 establishes the user plane connection with the UE 100, without establishing the control plane connection with the UE 100. An Xn interface is set between the MeNB 200-1 and the SeNB 200-2. The Xn interface is either an X2 interface or a new interface.

In the dual connectivity, the UE 100 is capable of performing carrier aggregation simultaneously utilizing N cells managed by the MeNB 200-1 and M cells managed by the SeNB 200-2. In the dual connectivity, the maximum number of serving cells of the UE 100, that is, the maximum number of (N+M) is five, for example. Here, a group including the N cells managed by the MeNB 200-1 is called a master cell group (MCG). Furthermore, a group including the M cells managed by the SeNB 200-2 is called a secondary cell group (SCG). In the SCG, a special cell provided with the PUCCH of the UE 100 is set. The special cell executes some of the functions of a primary cell (PCell) in the carrier aggregation. Hereinafter, the special cell is referred to as a "Primary SCell (PSCell)".

In the dual connectivity, the MeNB 200-1 is an eNB 200 in which at least the S1 interface for the control plane terminates. The MeNB 200-1 transmits, via the MCG, all RRC messages to the UE 100 set for the dual connectivity. On the other hand, the SeNB 200-2 provides an additional radio resource to the UE 100, in the dual connectivity. Furthermore, the SeNB 200-2 is not the MeNB 200-1.

FIGS. 6A and 6B and FIGS. 7A and 7B are diagrams for describing a configuration format of a transfer route (data path) of user data in the dual connectivity. There are two main types of user plane architecture (UP architecture) configuring the transfer route (data path) of the user data in the dual connectivity.

Figure 6A:
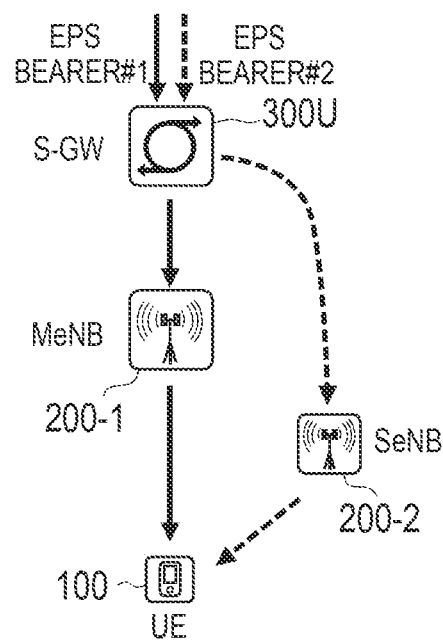
FIG. 6A and FIG. 6B are diagrams illustrating a first UP architecture.
Figure 6B:
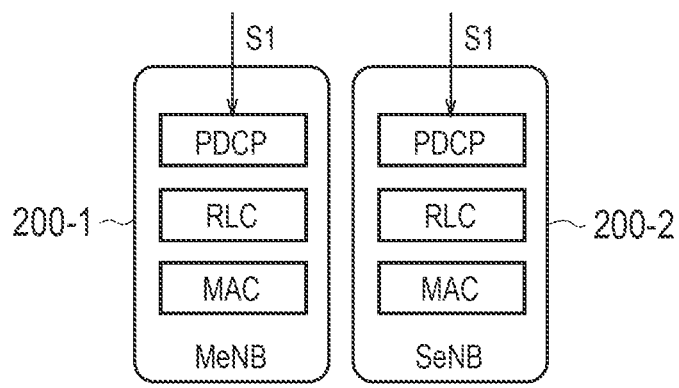

FIGS. 6A and 6B illustrate a first UP architecture. As illustrated in FIG. 6A, in the first UP architecture, an S1-U interface between the MeNB 200-1 and an S-GW 300U, and an S1-U interface between the SeNB 200-2 and the S-GW 300U are utilized. An EPS bearer #1 between the UE 100 and a P-GW passes through the S1-U interface between the MeNB 200-1 and the S-GW 300U. An EPS bearer #2 between the UE 100 and the P-GW passes through the S1-U interface between the SeNB 200-2 and the S-GW 300U. Thus, in the first UP architecture, the data path between the SeNB 200-2 and the S-GW 300U does not pass through the MeNB 200-1. As illustrated in FIG. 6B, each of the MeNB 200-1 and the SeNB 200-2 performs a process on each layer of the PDCP, the RLC, and the MAC.

Figure 7A:
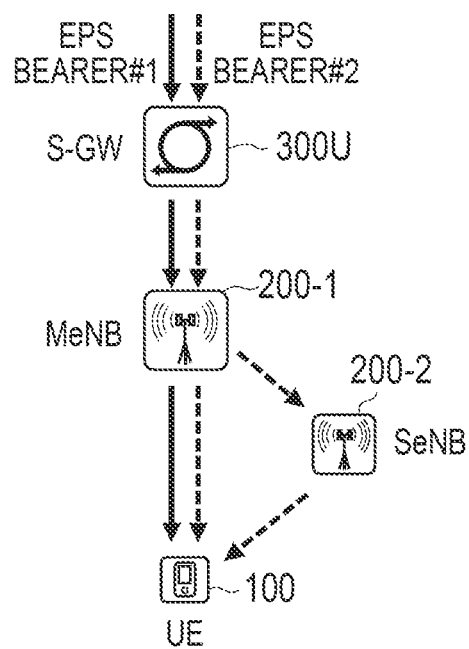
FIG. 7A and FIG. 7B are diagrams illustrating a second UP architecture.
Figure 7B:
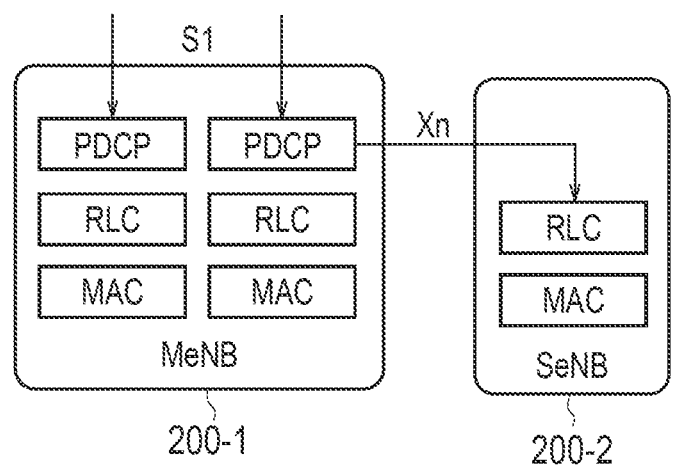

FIGS. 7A and 7B illustrate a second UP architecture. As illustrated in FIG. 7A, in the second UP architecture, an EPS bearer #2 between the UE 100 and the P-GW is split in the MeNB 200-1, and while one of the split parts (a split bearer) terminates in the UE 100 after passing through the SeNB 200-2, the other split part (a split bearer) terminates in the UE 100 without passing through the SeNB 200-2. Thus, in the second UP architecture, the data path between the SeNB 200-2 and the S-GW 300U passes through the MeNB 200-1. As illustrated in FIG. 7B, for one of the split parts (the split bearer) in the EPS bearer #2, the process on each layer is performed by the PDCP of the MeNB 200-1, and the RLC and the MAC of the SeNB 200-2. It is noted that in the split bearer, the processes up to the RLC (or some functions of the RLC) may be done by the MeNB.

(3) Operation According to Embodiment

Next, an operation according to the embodiment will be described with reference to FIGS. 8A to 8C and FIG. 9. FIGS. 8A to 8C and FIG. 9 are diagrams for describing an operation according to the embodiment.

Figure 8A:
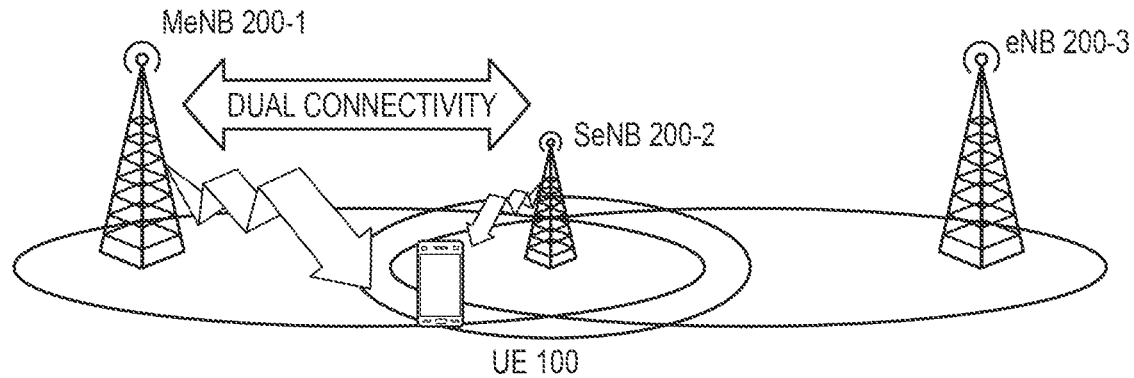
FIG. 8A to FIG. 8C are diagrams for describing an operation according to the embodiment.
Figure 8B:
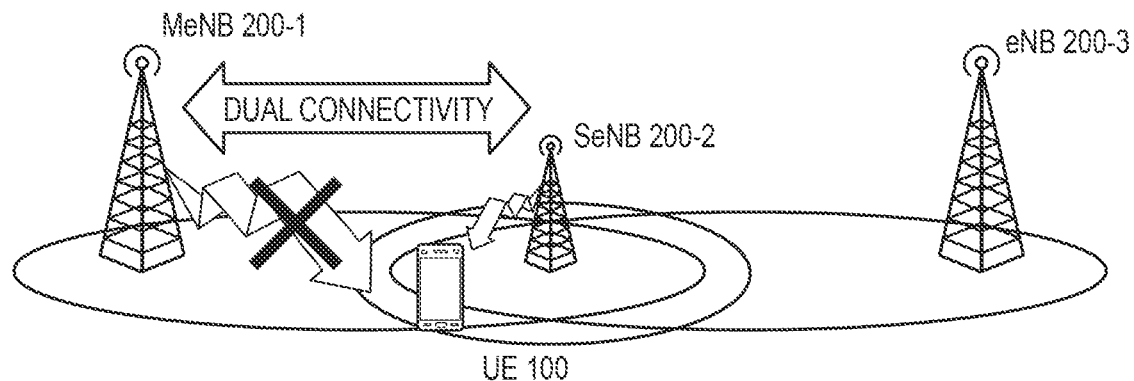
Figure 8C:
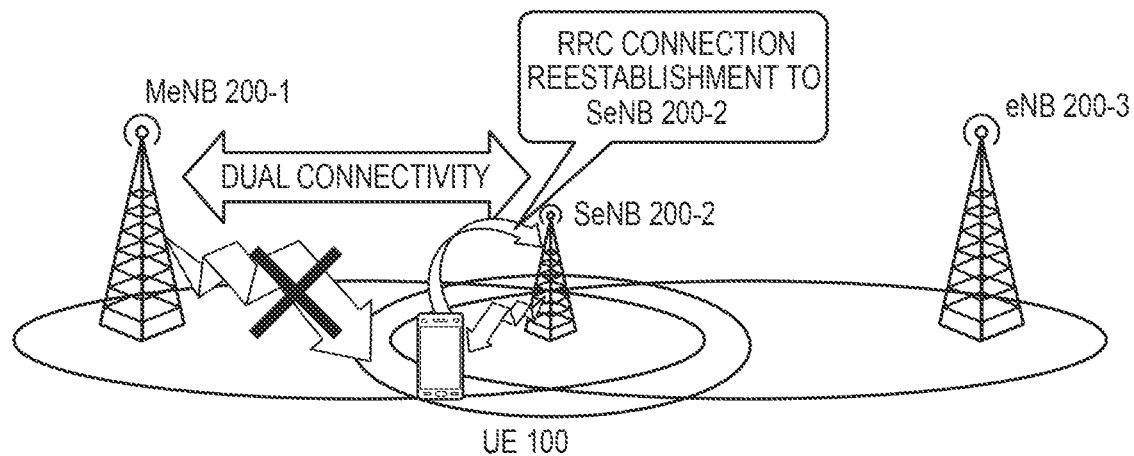

In FIGS. 8A to 8C, the UE 100 exits in the first cell (PCell) managed by the MeNB 200-1 and the second cell (PSCell or SCell) managed by a SeNB 200-1. In the embodiment, the SeNB 200-2 is located in the vicinity of a cell edge of the first cell and the first cell and the second cell overlap at least partially. The SeNB 200-2 may be located in the vicinity of a cell edge of a third cell managed by an eNB 200-3. The second cell and the third cell may overlap at least partially. Furthermore, the first cell and the third cell may overlap at least partially. As illustrated in FIGS. 8A to 8C, the first cell and the third cell may be a macro cell, and the MeNB 200-1 and the eNB 200-3 may be a macro eNB managing the macro cell. The second cell may be a small cell, and the SeNB 200-2 may be a small eNB managing the small cell.

As illustrated in FIG. 8A, the UE 100 is executing the dual connectivity. Specifically, the UE 100 establishes the RRC connection with the MeNB 200-1 which is a master eNB. The UE 100 is in an RRC connected state. On the other hand, the UE 100 is provided with an additional radio resource from the SeNB 200-2 which is the secondary eNB. The UE 100 performs communication with the MeNB 200-1 and the SeNB 200-2.

In this case, for example, it is assumed that a radio link failure (M-RLF) occurs between the UE 100 and the MeNB 200-1 as a consequence of a movement of the UE 100 (FIG. 8B). In this case, as illustrated in FIG. 8C, if the UE 100 detects the M-RLF, the UE 100 preferentially transmits an RRC re-connection request to the SeNB 200-2. In particular, if the M-RLF has occurred due to the movement of the UE 100, it is highly likely that the UE 100 is moving in a direction away from the MeNB 200-1. Thus, it is highly likely that a time period until the UE 100 resumes the communication can be shortened by the UE 100 preferentially transmitting the RRC re-connection request to the SeNB 200-2, rather than waiting for the M-RLF to be resolved.

Firstly, as illustrated in FIG. 9, the UE 100 detects a radio problem upon receiving out-of-synch indications about the first cell (PCell) N310 times consecutively from a lower layer (S1). If detecting the radio problem, the UE 100 starts a T310 timer (S2). The UE 100 stops the T310 timer upon receiving in-synch indications about the first cell (PCell) N311 times consecutively from a lower layer.

If the T310 timer has expired (S3), the UE 100 senses the radio link failure between the UE 100 and the MeNB 200-1 (PCell). In response to sensing the radio link failure, the UE 100 starts a T311 timer (S4). On the other hand, the UE 100 starts searching a suitable cell for cell (re-)selection (S5). Specifically, the UE 100 executes a cell reselection procedure. Here, a suitable cell is, for example, a cell with a highest reception level of a radio signal in the UE 100. If the suitable cell has been searched, the UE 100 stops the T311 timer. If the radio link failure is resolved, and the UE 100 has searched (selected) a first cell (PCell), for example, the UE 100 starts an RRC reestablishment procedure (S6). The UE 100 starts a T301 timer.

Here, a method of preferentially transmitting, by the UE 100, the RRC reestablishment request to the SeNB 200-2 will be described.

In a first method, the UE 100 preferentially radio-link-failure transmits the RRC reestablishment request to the SeNB 200-2 by omitting a cell search.

Specifically, the UE 100 determines whether or not the radio link failure has occurred between the UE 100 and the SeNB 200-2. For example, the UE 100 detects a radio problem upon receiving the out-of-synch indications about the second cell (PSCell) N313 times consecutively from a lower layer. If detecting the radio problem, the UE 100 starts a T313 timer. If the T313 timer has expired, the UE 100 senses the radio link failure between the UE 100 and the SeNB 200-1 (PSCell). If the UE 100 senses such a radio link failure, the occurrence of the radio link failure between the UE 100 and the SeNB 200-2 may be determined. Alternatively, the UE 100 may determine that the radio link failure has occurred if the radio problem has been detected. Alternatively, the UE 100 may determine that a radio link failure has occurred if the UE 100 receives a predetermined number of times (the number being lower than N313) consecutively the out-of-synch indications about the second cell (PSCell) from a lower layer.

If no radio link failure has occurred (no radio link failure has been detected) between the UE 100 and the SeNB 200-2, the UE 100 omits the above-mentioned processes S4 and S5 and transmits the RRC reestablishment request to the SeNB 200-2. Thus, the cell search is omitted, and thus, the RRC reestablishment request is preferentially transmitted to the SeNB 200-2. By omitting the cell search, it is possible to shorten the time until the UE 100 resumes the communication.

In a second method, the UE 100 performs cell search, based on the priority information used to prioritize the cell of the SeNB 200-2 (second cell (PSCell) or another cell (SCell) of the SeNB 200-2 cell) when the cell search is performed.

After establishing the RRC connection with the UE 100, the MeNB 200-1 transmits, to the UE 100, the priority information used to prioritize the cell of the SeNB 200-2 (second cell (PSCell) or the other cell (SCell) of the SeNB 200-2 cell) when the cell search is performed. The priority information may be transmitted by an RRC message.

The priority information may be, for example, an offset value added to the reception level of the radio signal from the cell of the SeNB 200-2, or an offset value to lower a threshold value compared with the reception level of the radio signal from the cell of the SeNB 200-2. If the reception level exceeds a threshold value in which the offset value is taken into consideration, it is possible to select the cell of the SeNB 200-2. Alternatively, the priority information may be information for requesting preferential confirmation of a radio signal from the cell of the SeNB 200-2.

Here, existing priority information is transmitted only when an RRC connection release message is transmitted. Thus, the UE 100 releases the RRC connection and priority information is not set unless the UE 100 has shifted into an idle state. Therefore, the priority information may be transmitted by an RRC connection resetting message. Thereby, the UE 100 is capable of setting the priority information in an RRC connected state in which the RRC connection with the MeNB 200-1 is established. Thus, the UE 100 is capable of executing a cell reselection procedure, based on the priority information, without shifting into the idle state, and thus, it is possible to shorten the time until the UE 100 resumes the communication.

It is noted that the MeNB 200-1 may transmit, together with the priority information, information indicating a timer that starts if the radio link failure (M-RLF) with the MeNB 200-1 is detected. The UE 100 may stop the timer if the UE 100 searches a suitable cell. Furthermore, the UE 100 may discard the priority information if the timer has expired.

It is noted that the UE 100 is capable of performing cell selection regardless of whether or not the UE 100 detects the radio link failure with the SeNB 200-2.

Next, as illustrated in FIG. 8C, a case is described where the UE 100 transmits the RRC reestablishment request to the SeNB 200-2.

Before transmitting the RRC reestablishment request, the UE 100 transmits a request for allocating an uplink radio resource (scheduling request: SR) to the SeNB 200-2. Specifically, the UE 100 transmits the scheduling request on the PUCCH.

The scheduling request may include information (flag) indicating that the scheduling request is different from a normal scheduling request. Specifically, the scheduling request may include information indicating that only the RRC reestablishment request is transmitted, or information indicating that the dual connectivity have been executed. Alternatively, new uplink control information (UCI) indicating (implicitly) that the scheduling request is different from a normal scheduling request, may be prescribed. The scheduling request may include the uplink control information or separately from the scheduling request, the uplink control information may be transmitted to the eNB 200 from the UE 100.

The UE 100 may transmit the scheduling request, only before a predetermined time period has elapsed since the M-RLF is detected. Thus, the UE 100, which is asynchronous with the SeNB 200-2 (SCG pTAG), can avoid a situation where the SeNB 200-2 cannot receive the scheduling request. If a predetermined time period has elapsed, the UE 100 may transmit an RACH signal used for allocating from the SeNB 200-2 an uplink radio resource for transmitting the RRC reestablishment request.

While being synchronized with the UE 100, the SeNB 200-2 can receive the scheduling request. In response to reception of the scheduling request, the SeNB 200-2 allocates an uplink radio resource (UL-SCH) to the UE 100. The eNB 200 transmits the allocated uplink radio resource to the UE 100. The UE 100 uses the allocated uplink radio resource to transmit the RRC reestablishment request to the eNB 200 via a CCCH. (A message including) The RRC reestablishment request corresponds to a message 3 of the existing random access procedure. Therefore, the UE 100, which transmits the scheduling request, instead of transmitting the RACH signal, is highly likely to be allocated with an uplink radio resource from the SeNB 200-2. Therefore, it is possible to shorten a time period until the UE 100 resumes communication.

Upon reception of a special scheduling request including information indicating that the scheduling request is different from a usual scheduling request, the SeNB 200-2 may preferentially allocate the uplink radio resource to the UE 100 from which the special scheduling request is transmitted.

Upon reception if the RRC reestablishment request, the SeNB 200-2 determines whether or not to re-establish the RRC connection, based on authentication information and context information included in the RRC reestablishment request. The SeNB 200-2 obtains the context information from the MeNB 200-1. Alternatively, the SeNB 200-2 may obtain context information from a target eNB to which the UE 100 performs handover. A method of obtaining, by the SeNB 200-2, the context information will be described later.

The context information includes a security context. The security context includes KeNB*, a token, NCC, UE EPS security capability, and a security algorithm.

It is noted that the context information as used herein is information at least partially different from context information included in an existing addition request for requesting provision of an additional radio resource in the dual connectivity. The context information included in the existing addition request alone cannot reestablish the RRC connection.

Upon determination to reestablish the RRC connection, the SeNB 200-2 transmits the RRC connection reestablishment message to the UE 100. The UE 100 that has received the RRC connection reestablishment message, reestablishes the RRC connection. Afterwards, the UE 100 transmits an RRC connection reestablishment complete message to the SeNB 200-2.

(4) Obtaining of Context Information

Figure 12:
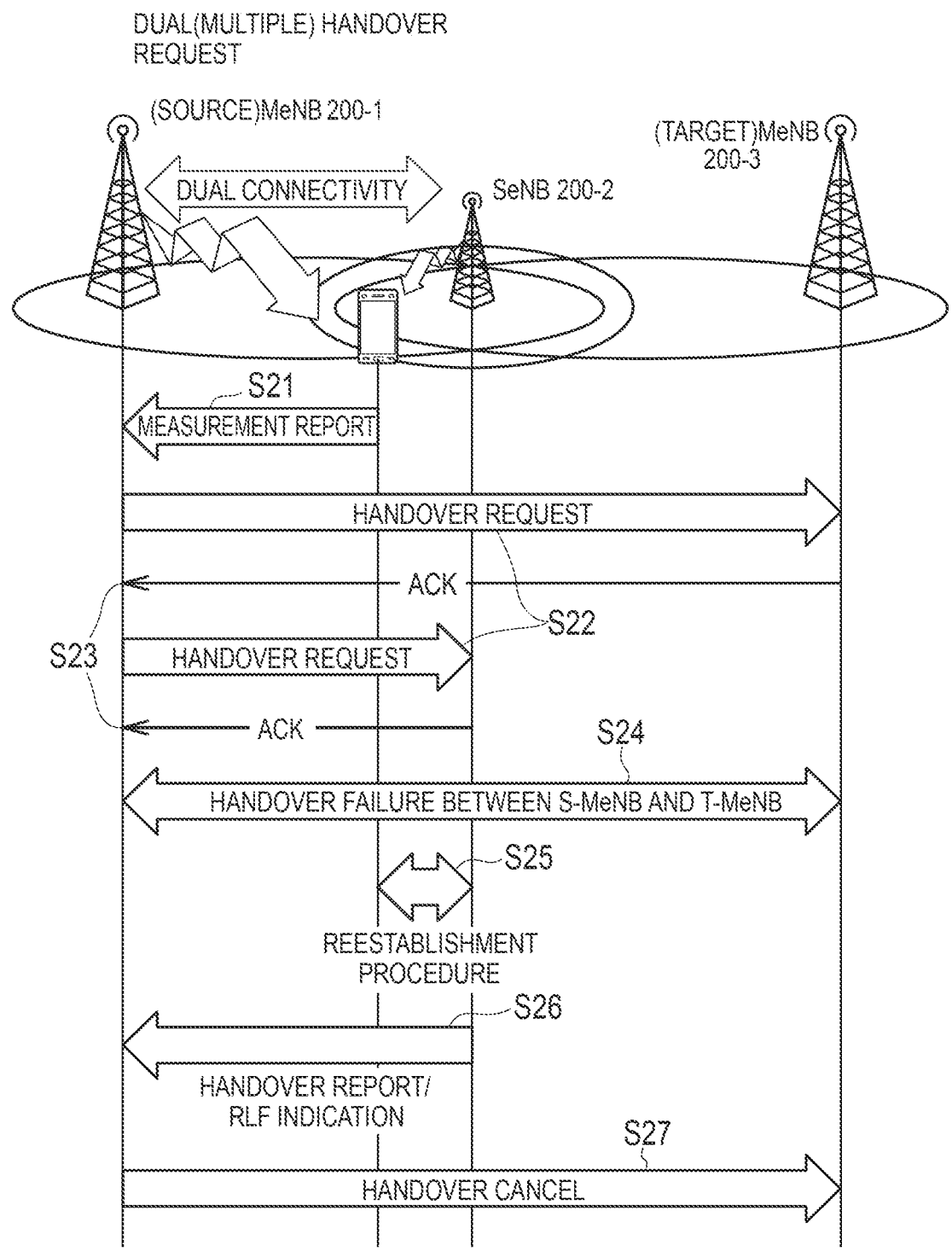
FIG. 12 is a diagram illustrating an example of a method of obtaining, by the SeNB 200-2, the context information.

Next, a method of obtaining, by the SeNB 200-2, context information will be described with reference to FIG. 10 to FIG. 12. FIG. 10 is a diagram illustrating an example of a method of obtaining, by the SeNB 200-2, context information. FIG. 11 is a chart illustrating an example of the context information by the SeNB 200-2. FIG. 12 is a diagram illustrating an example of a method of obtaining, by the SeNB 200-2, the context information.

In a first method, in response to reception of an RRC connection reestablishment request from the UE 100, the SeNB 200-2 requests the context information, to the MeNB 200-1.

As illustrated in FIG. 10, in step S11, the UE 100 transmits the RRC connection reestablishment request to the eNB 200.

In step S12, the SeNB 200-2 transmits a UE context request for obtaining the context information of the UE 100.

In step S13, in response to reception of the UE context request, the MeNB 200-1 transmits the context information of the UE 100 to the SeNB 200-2. Thus, the SeNB 200-2 is capable of obtaining UE context information.

It is noted that the UE context request may be a request made to the MeNB 200-1 to authenticate the UE 100 as described later. In this case, the MeNB 200-1, which has received the UE context request, transmits, to the SeNB 200-2, not only the UE context information, but also information indicating an authentication result of the UE 100. The information indicating the authentication result of the UE 100 may be included in a response to the UE context request. Thus, the SeNB 200-2 is capable of omitting the authentication of the UE 100.

In a second method, the MeNB 200-1 includes the context information into an addition request for requesting provision of an additional radio resource in the dual connectivity.

The MeNB 200-1 transmits an addition request (SeNB Addition Request) to the SeNB 200-2. The addition request includes the context information used to reestablish the RRC connection. The addition request includes AS-context information. The AS-context information can include an mbmsIntersetIndication, which is another context information. Therefore, the MeNB 200-1 can include, for example, context information (RestablishmentInfo) used for reestablishing the RRC connection in the AS-context information. The context information (Restablishment Info) can include an IE illustrated in FIG. 11.

As a result, the SeNB 200-2 is capable of obtaining the context information beforehand, and thus, it is possible to shorten the time period until the UE 100 resumes the communication.

It is noted that at the time when the MeNB 200-1 transmits the addition request, the SeNB 200-2 is a candidate for a secondary eNB rather than a secondary eNB.

In a third method, the MeNB 200-1 transmits the context information after starting the execution of the dual connectivity.

After starting the execution of the dual connectivity, the MeNB 200-1 transmits the context information at any timing. For example, the MeNB 200-1 may include the context information into a modification request (SeNB Modification Request) for requesting preparation for modifying the radio resource for the UE 100. Alternatively, the MeNB 200-1 may include the context information into another control message about the dual connectivity.

As a result, the SeNB 200-2 is capable of obtaining the context information beforehand, and thus, it is possible to shorten the time period until the UE 100 resumes the communication.

In a fourth method, the MeNB 200-1 transmits the context information according to a measurement report about a handover received from the UE 100.

Upon reception of a measurement report about a handover from the UE 100, (regardless of whether or not transmitting a handover request to the SeNB 200-2) the MeNB 200-1 transmits the context information to the SeNB 200-2. Alternatively, upon transmission of the handover request to the SeNB 200-2, the MeNB 200-1 may include the context information into the handover request. Alternatively, as illustrated in FIG. 12, upon transmission of the handover request to each of a plurality of eNBs 200 (SeNB 200-2 and (T-)MeNB 200-3 (Target MeNB 200-3)), the (S-)MeNB 200-1 (Source MeNB 200-1) may include the context information into every handover request.

FIG. 12 illustrates an operation environment similar to that in FIG. 8A.

As illustrated in FIG. 12, in step S21, the UE 100 transmits, to the (S-)MeNB 200-1, a measurement report about a handover.

In step S22, the MeNB 200-1 transmits, according to the measurement report, a handover request to each of a plurality of eNBs 200 (SeNB 200-2 and (T-)MeNB 200-3). Each handover request includes the context information.

In step S23, each of the SeNB 200-2 and the T-MeNB 200-3 transmits an acknowledgment (ACK) to the handover request. It is noted that the SeNB 200-2 and the T-MeNB 200-3 may not transmit the acknowledgment.

Description proceeds on the assumption that it has been determined that the UE 100 executes a handover to the T-MeNB 200-3.

In step S24, the UE 100 fails the handover between the MeNB 200-1 and the T-MeNB 200-3.

In step S25, the UE 100 executes, in response to the handover failure, an RRC reestablishment procedure for the SeNB 200-2. In the RRC reestablishment procedure, the UE 100 transmits the RRC reestablishment request to the SeNB 200-2. The SeNB 200-2 previously obtains the UE context information, and thus, it is possible to shorten the time period until the UE 100 resumes the communication.

In step S26, the SeNB 200-2 reestablishes the RRC connection with the UE 100, and then, transmits the handover report to the MeNB 200-1. The SeNB 200-2 may recognize that this handover is not destined to an erroneous cell because the RRC connection is established with the UE 100 executing the dual connectivity with the SeNB 200-2. In this case, the handover report may include information indicating that this handover is not destined to an erroneous cell. Alternatively, after establishing the RRC connection, the SeNB 200-2 may transmit, to the MeNB 200-1, the radio link failure report (RLF report) received from the UE 100.

In step S27, the MeNB 200-1 transmits, based on the handover report or the RLF report, a handover cancel message to the T-MeNB 200-3.

The MeNB 200-1 may transmit the handover cancel message, based on information indicating that the handover is not destined to an erroneous cell. Alternatively, based on the fact that the target to which the handover report is transmitted is the SeNB 200-2 having executed the dual connectivity, the MeNB 200-1 may determine that the UE 100 attempts to reestablish the RRC connection with the SeNB 200-2, and transmit the handover cancel message. Alternatively, the MeNB 200-1 may transmit the handover cancel message as a result of a DC indicator described later being included in the RLF report. Alternatively, upon receiving a UE context release message from the SeNB 200-2, the MeNB 200-1 may transmit the handover cancel message to the T-MeNB 200-3.

It is noted that if the handover to the T-MeNB 200-3 is successful, the MeNB 200-1 may transmit the handover cancel message to the SeNB 200-2 in response to reception of the UE context release message from the T-MeNB 200-3.

In a fifth method, the SeNB 200-2 obtains context information from a target eNB to which the UE 100 performs handover.

For example, the SeNB 200-2 obtains information (for example, a cell ID) indicating a target eNB of the UE 100. The SeNB 200-2 may obtain information indicating a target eNB from the UE 100 or from the MeNB 200-1 which is a source eNB. Alternatively, the SeNB 200-2 may obtain information indicating a target eNB from the MME. The SeNB 200-2 requests the context information to a target eNB, based on the information indicating the target eNB. The target eNB is capable of including the context information into a response to the request. The SeNB 200-2 that has received the response to the request obtains the context information.

(5) Authentication of MeNB 200-1

Next, an authentication of the MeNB 200-1 will be described with reference to FIG. 13. FIG. 13 is a diagram for describing an example of an IE included in the RRC reestablishment request.

The RRC reestablishment request normally includes a Failure Cell PCI, a C-RNTI (MeNB 200-1 cell ID), and a Short MAC-I. Based on these pieces of information (hereinafter, "UE context information"), the authentication of the UE 100 is performed. It is noted that the Short MAC-I is generated based on a Cell PCI (a cell PCI when an M-RLF occurs), a C-RNTI (a C-RNTI when an M-RLF ooccurs, and a cellIdentity (a current cell ID).

The SeNB 200-2 does not normally know the UE context information in the MeNB 200-1, and thus, the SeNB 200-2 may request the MeNB 200-1 to authenticate the UE 100. Thus, the user terminal may not efficiently resume the communication.

Therefore, the UE 100 includes the authentication information (UE context information) based on a cell identifier of the SeNB 200-2, into the RRC reestablishment request. That is, within the RRC reestablishment request, a field for the MeNB 200-1 and a field for the SeNB 200-2 are provided.

For example, as illustrated in FIG. 13, the field for the SeNB 200-2 may include, in the RRC reestablishment request, as authentication information, a Short MAC-I generated on the basis of a C-RNTI (a value given in the SCG), a Cell PCI (a cell ID of the PSCell), and a cell identifier of the SeNB 200-2. It is noted that the Short MAC-I is generated based on a C-RNTI (a value given in the SCG), a Cell PCI (a cell ID of the PSCell), and a cellIdentity (a current cell ID).

Thus, the SeNB 200-2 is capable of authenticating the UE 100, based on the authentication information based on the cell identifier of the SeNB 200-2, and thus, it is possible to omit requesting the MeNB 200-1 to authenticate the UE 100. As a result, it is possible to shorten the time period until the UE 100 resumes the communication.

(6) DC Indicator

Next, a DC indicator will be described. FIG. 14 is a diagram for describing an example of an IE included in the RRC reestablishment request.

The UE 100 may include a DC indicator indicating that the UE 100 executed dual connectivity, into the RRC reestablishment request. Alternatively, the UE 100 may include the DC indicator into a radio link failure report (RLF report). For example, as illustrated in FIG. 14, the RRC reestablishment request may include the DC indicator (DualConnectivityIndicator).

If the DC indicator is included in the RRC reestablishment request, the eNB 200 that has received the RRC reestablishment request knows that the UE 100 executed dual connectivity. The eNB 200 is capable of determining whether or not to execute dual connectivity with the UE 100. Furthermore, by referring to PCell information in the RRC reestablishment request, the eNB 200 is capable of knowing a secondary eNB 200 that executed dual connectivity. After reestablishing RRC connection with the UE 100, the eNB 200 may transmit an addition request (SeNB Addition Request) to the secondary eNB 200. By executing dual connectivity with the secondary eNB 200, the eNB 200 is capable of maintaining the QoS of the UE 100.

Furthermore, the eNB 200 is capable of specifying an MeNB 200-1 in which an M-RLF can easily occur, on the basis of the RRC reestablishment request (or the RLF report) including a DC indicator. In this case, the eNB 200 may reject an addition request (SeNB Addition Request) from the specified MeNB 200-1. If the eNB 200 transmits a rejection response (SeNB Addition Reject) to the addition request, the rejection response may include a reason for the rejection response indicating that an M-RLF in the specified MeNB 200-1 is a cause. The reason for the rejection response may indicate that the specified MeNB 200-1 has too many M-RLFs.

Furthermore, if the UE 100 executing dual connectivity performs a handover, the number of eNBs 200 involved in the UE 100 is large, and thus, it may be assumed that signaling increases. As a result, if the dual connectivity is executed, it is highly likely that the handover failure occurs on the grounds that the HO is too late. It is preferable to distinguish this handover failure, which originates from the execution of the dual connectivity, from a normal handover failure. The eNB 200 may adjust a handover parameter (HO parameter) based on a normal handover failure and adjust an HO parameter based on a handover failure originating from execution of dual connectivity to thereby adequately adjust the HO parameter.

If the RLF report includes the DC indicator, the eNB 200 can know that the handover failure originates from the execution of the dual connectivity, and thus, the eNB 200 is capable to distinguishing the handover failure originating from the execution of the dual connectivity from a normal handover failure. As a result, the eNB 200 is capable of adequately adjusting the HO parameter.

(7) UE Context Release Message

Next, a UE context release message will be described.

If an M-RLF results in the UE 100 reestablishing the RRC connection with the SeNB 200, it is considered that the UE 100 ends the dual connectivity with the MeNB 200-1 and the SeNB 200-2. In this case, an SeNB release procedure to release a secondary eNB is started. Here, in the SeNB release procedure, the MeNB 200-1 transmits, to the SeNB 200-2, a UE context release message for releasing a C plane and a radio related to a resource associated with a UE context. The SeNB 200-2 cannot reject an existing UE context release message. Therefore, even though the SeNB 200-2 has established the RRC connection with the UE 100, in response to reception of the UE context release message, the SeNB 200-2 may release even necessary context information of the UE 100.

Thus, upon reception of the UE context release message from the MeNB 200-1 and upon (re-)establishment of the RRC connection with the UE 100 that has executed the dual connectivity, the SeNB 200-2 may reject the UE context release message. In this case, the SeNB 200-2 is capable of transmitting to the MeNB 200-1 the rejection response to the release message. The rejection response may include a reason for the rejection response indicating that the SeNB 200-2 has (re-)established the RRC connection with the UE 100.

Alternatively, if the SeNB 200-2 transmits an SeNB release request (SeNB Release Required) to the MeNB 200-1, the SeNB release request may include information indicating that the SeNB 200-2 has (re-)established the RRC connection with the UE 100. In this case, the MeNB 200-1 may transmit the UE context release message.

Thus, even though the SeNB 200-2 has established the RRC connection with the UE 100, the SeNB 200-2 is capable of preventing from releasing necessary context information of the UE 100.

Other Embodiments

In the above-described embodiment, in the first method of preferentially transmitting, by the UE 100, the RRC reestablishment request to the SeNB 200-2, upon determination that no radio link failure (S-RLF) occurs between the UE 100 and the SeNB 200-2 (if no S-RLF has been sensed), the UE 100 transmits the RRC reestablishment request to the SeNB 200-2; however, this is not limiting. If a radio link failure (M-RLF) occurs between the UE 100 and the MeNB 200-1, the UE 100 may transmit the RRC reestablishment request to the SeNB 200-2 without determining whether or not an S-RLF occurs. As a result, it is possible to shorten the time period until the UE 100 resumes the communication.

It is noted that if an M-RLF occurs, the UE 100 may transmit the RRC reestablishment request to a target eNB to which the UE 100 makes handover. For example, upon sensing an S-RLF after sensing occurrence of an M-RLF, the UE 100 may transmit the RRC reestablishment request to the target eNB to which the UE 100 makes handover.

In the above-described embodiment, the SeNB 200-2 requests the MeNB 200-1 to authenticate the UE 100; however, this is not limiting. The SeNB 200-2 may request the target eNB to which the UE 100 makes handover to authenticate the UE 100. The target eNB can authenticate the UE 100 similarly to the MeNB 200-1 and notify the SeNB 200-2 of a response including the authentication result. Thus, the SeNB 200-2 is capable of omitting the authentication of the UE 100.

In the above-described embodiment, an LTE system is described as an example of the mobile communication system; however the LTE system is not an exclusive example, and the contents of the present application may be applied to a system other than the LTE system.

It is noted that the entire content of U.S. Provisional Application No. 62/110,023 (filed on Jan. 30, 2015) is incorporated herein by reference.

The invention claimed is:

1. A user terminal capable of executing dual connectivity, comprising:
a controller configured to execute the dual connectivity in which a first base station configured to establish an RRC connection with the user terminal and a second base station configured to provide an additional radio resource are used; and
a receiver configured to receive, from the first base station, preferential information for prioritizing a cell of the second base station when selecting a cell, and information indicating a timer for the radio link failure between the user terminal and the first base station;
a transmitter configured to transmit, to the second base station, a failure report indicating that the radio link failure is detected between the user terminal and the first base station, in response to the radio link failure being detected between the user terminal and the first base station, wherein
the failure report is further transmitted from the second base station to the first base station,
the controller is configured to:
start the timer after the radio link failure detection;
select a suitable cell based on the preferential information during running the timer;
stop the timer when the suitable cell is selected; and
discard the preferential information when the timer is expired.

2. The user terminal according to claim 1, wherein the failure report includes an indicator indicating that the user terminal has executed the dual connectivity.

3. The user terminal according to claim 1, wherein the controller is configured to set the preferential information in a connected state in which the RRC connection is established between the user terminal and the first base station.

4. A method comprising:
executing, by a user terminal capable of executing dual connectivity, the dual connectivity in which a first base station configured to establish an RRC connection with the user terminal and a second base station configured to provide an additional radio resource;
receiving, by the user terminal from the first base station, information indicating a timer for the radio link failure between the user terminal and the first base station, and preferential information that prioritizes selection of the second base station when selecting a suitable cell;
transmitting, by the user terminal to the second base station, a failure report indicating that the radio link failure is detected between the user terminal and the first base station, in response to the radio link failure being detected between the user terminal and the first base station;
transmitting, by the second base station to the first base station, the failure report;
starting, by the user terminal, the timer after the radio link failure detection;
selecting, by the user terminal, a suitable cell during running the timer;
stopping, by the user terminal, the timer when the suitable cell is selected; and
discarding, by the user terminal, the preferential information when the timer is expired.

5. A processor controlling a user terminal capable of executing dual connectivity, the processor configured to execute:
a process of executing the dual connectivity in which a first base station configured to establish an RRC connection with the user terminal and a second base station configured to provide an additional radio resource; and
a process of receiving, from the first base station, information indicating a timer for the radio link failure between the user terminal and the first base station, and preferential information that prioritizes selection of the second base station when selecting a suitable cell;
a process of transmitting, to the second base station, a failure report indicating that the radio link failure is detected between the user terminal and the first base station, in response to the radio link failure being detected between the user terminal and the first base station, wherein
the failure report is further transmitted from the second base station to the first base station, wherein
the processor is further configured to execute:
a process of starting the timer after the radio link failure detection;
a process of selecting a suitable cell during running the timer;
a process of stopping the timer when the suitable cell is selected; and
a process of discarding the preferential information when the timer is expired.

* * * * *